United States Patent
Campton et al.

(10) Patent No.: US 11,448,177 B2
(45) Date of Patent: Sep. 20, 2022

(54) PERMANENTLY ENGAGED STARTER ASSEMBLY

(71) Applicant: BorgWarner Inc., Auburn Hills, MI (US)

(72) Inventors: Calahan B. Campton, Royal Oak, MI (US); James R. Papania, Frankfort, IL (US); Michael W. Campbell, Royal Oak, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 17/388,239

(22) Filed: Jul. 29, 2021

(65) Prior Publication Data

US 2022/0065212 A1    Mar. 3, 2022

Related U.S. Application Data

(60) Provisional application No. 63/072,990, filed on Sep. 1, 2020.

(51) Int. Cl.
*F02N 15/02* (2006.01)
*F16D 43/16* (2006.01)

(52) U.S. Cl.
CPC .......... *F02N 15/026* (2013.01); *F02N 15/023* (2013.01); *F16D 43/16* (2013.01)

(58) Field of Classification Search
CPC ............................... F16D 43/16; F02N 15/026
See application file for complete search history.

(56) References Cited

U.S. PATENT DOCUMENTS

| | | |
|---|---|---|
| 9,803,611 B2 | 10/2017 | Showalter |
| 10,018,230 B2 | 7/2018 | Peglowski |
| 10,274,026 B2 | 4/2019 | Veit et al. |

(Continued)

FOREIGN PATENT DOCUMENTS

| | | |
|---|---|---|
| DE | 102015008895 A1 | 1/2017 |
| DE | 102015014029 A1 | 5/2017 |

OTHER PUBLICATIONS

Machine-assisted English language abstract and machine-assisted English translation for DE 10 2015 008 895 A1 extracted from espacenet.com database on Jun. 9, 2021, 22 pages.

(Continued)

*Primary Examiner* — David M Fenstermacher
(74) *Attorney, Agent, or Firm* — Howard & Howard Attorneys PLLC

(57) ABSTRACT

A permanently engaged starter system for use in a vehicle, with the vehicle including a crankshaft and an engine block, includes a dual-mass flywheel and a permanently engaged starter assembly. The dual-mass flywheel extends along an axis and has an inner diameter portion disposed about and adjacent the axis and an outer diameter portion disposed about the axis such that the inner diameter portion is disposed between the outer diameter portion and the axis. The permanently engaged starter assembly includes a one-way clutch and a ring gear. The one-way clutch extends along the axis and includes an inner member disposed about the axis and an outer member disposed about the inner member. The ring gear is rotatably coupled to the one-way clutch and is adapted to be rotatably coupled to the outer diameter portion of the dual-mass flywheel through the one-way clutch.

24 Claims, 7 Drawing Sheets

(56) References Cited

U.S. PATENT DOCUMENTS

| | | | |
|---|---|---|---|
| 10,619,701 B2 | 4/2020 | Maguire et al. | |
| 11,384,724 B2* | 7/2022 | Campton | F02N 15/023 |
| 2002/0104499 A1* | 8/2002 | Sanada | F02N 99/004 |
| | | | 123/179.3 |
| 2013/0218432 A1* | 8/2013 | Kudo | F02N 15/027 |
| | | | 701/67 |
| 2015/0114783 A1* | 4/2015 | Baeumler | F02N 15/023 |
| | | | 192/45.018 |
| 2015/0176557 A1* | 6/2015 | Champalou | F02N 15/006 |
| | | | 74/7 C |
| 2017/0122386 A1 | 5/2017 | Veit et al. | |
| 2017/0284480 A1* | 10/2017 | Veit | F02N 15/023 |
| 2021/0372357 A1* | 12/2021 | Campton | F02N 15/022 |
| 2022/0003279 A1* | 1/2022 | Lin | F16D 41/061 |
| 2022/0065212 A1* | 3/2022 | Campton | F02N 15/023 |

OTHER PUBLICATIONS

English language abstract for DE 10 2015 014 029 A1 extracted from espacenet.com database on Jun. 9, 2021, 2 pages.
U.S. Appl. No. 17/332,516, filed May 27, 2021.
U.S. Appl. No. 17/332,551, filed May 27, 2021.

* cited by examiner

PERMANENTLY ENGAGED STARTER ASSEMBLY

CROSS-REFERENCE TO RELATED APPLICATION

The present application claims priority to and all the benefits of U.S. Provisional Patent Application No. 63/072,990 filed Sep. 1, 2020, the disclosure of which is expressly hereby incorporated herein by reference in its entirety.

BACKGROUND OF THE INVENTION

1. Field of the Invention

The present invention generally relates to a permanently engaged starter assembly and, more specifically, to a permanently engaged starter assembly for use in a permanently engaged starter system for use in a vehicle.

2. Description of the Related Art

Conventional permanently engaged starter assemblies for use in a permanently engaged starter system of a vehicle include a one-way clutch, a ring gear rotatably coupled to the one-way clutch, and a starter motor including a pinion gear rotatably coupled to the ring gear. Conventional permanently engaged starter systems include a dual-mass flywheel or a torque converter including a flexplate. The ring gear is adapted to provide rotational torque to a crankshaft of an engine of the vehicle through the one-way clutch and the dual-mass flywheel or the flexplate of the torque converter. However, conventional permanently engaged starter assemblies are often costly, occupy substantial space in an engine bay, and are limited in their configurations and orientations within the engine bay.

As such, there remains a need to provide an improved permanently engaged starter system.

SUMMARY OF THE INVENTION AND ADVANTAGES

A permanently engaged starter system for use in a vehicle, with the vehicle including a crankshaft and an engine block, includes a dual-mass flywheel and a permanently engaged starter assembly. The dual-mass flywheel extends along an axis and has an inner diameter portion disposed about and adjacent the axis and an outer diameter portion disposed about the axis such that the inner diameter portion is disposed between the outer diameter portion and the axis. The permanently engaged starter assembly includes a one-way clutch and a ring gear. The one-way clutch extends along the axis and includes an inner member disposed about the axis and an outer member disposed about the inner member. The ring gear is rotatably coupled to the one-way clutch and is adapted to be rotatably coupled to the outer diameter portion of the dual-mass flywheel through the one-way clutch.

Accordingly, having the ring gear rotatably coupled to the one-way clutch and adapted to be rotatably coupled to the outer diameter portion of the dual-mass flywheel through the one-way clutch allows the permanently engaged starter assembly to be used with multiple dual-mass flywheel designs. Additionally, having the ring gear rotatably coupled to the outer diameter portion of the dual-mass flywheel reduces the packaging space of the permanently engaged starter system within an engine bay of the vehicle and, specifically, the axial packaging space of the permanently engaged starter system.

In another embodiment, a permanently engaged starter system for use in a vehicle, with the vehicle including a crankshaft and an engine block, includes a torque converter and a permanently engaged starter assembly. The torque converter includes a flexplate extending along an axis. The flexplate has an inner flex diameter portion disposed about and adjacent the axis and an outer flex diameter portion disposed about the axis such that the inner flex diameter portion is disposed between the outer flex diameter portion and the axis. The permanently engaged starter assembly includes a one-way clutch and a ring gear. The one-way clutch extends along the axis and includes an inner member disposed about the axis and an outer member disposed about the inner member. The ring gear is rotatably coupled to the one-way clutch and is adapted to be rotatably coupled to the outer flex diameter portion of the flexplate through the one-way clutch.

Accordingly, having the ring gear rotatably coupled to the one-way clutch and adapted to be rotatably coupled to the outer flex diameter portion of the flexplate through the one-way clutch allows the permanently engaged starter assembly to be used with multiple flexplate designs. Additionally, having the ring gear rotatably coupled to the outer flex diameter portion of the flexplate reduces the packaging space of the permanently engaged starter system within an engine bay of the vehicle and, specifically, the axial packaging space of the permanently engaged starter system.

BRIEF DESCRIPTION OF THE DRAWINGS

Other advantages of the present invention will be readily appreciated, as the same becomes better understood by reference to the following detailed description when considered in connection with the accompanying drawings.

DETAILED DESCRIPTION OF THE INVENTION

Figure 7:
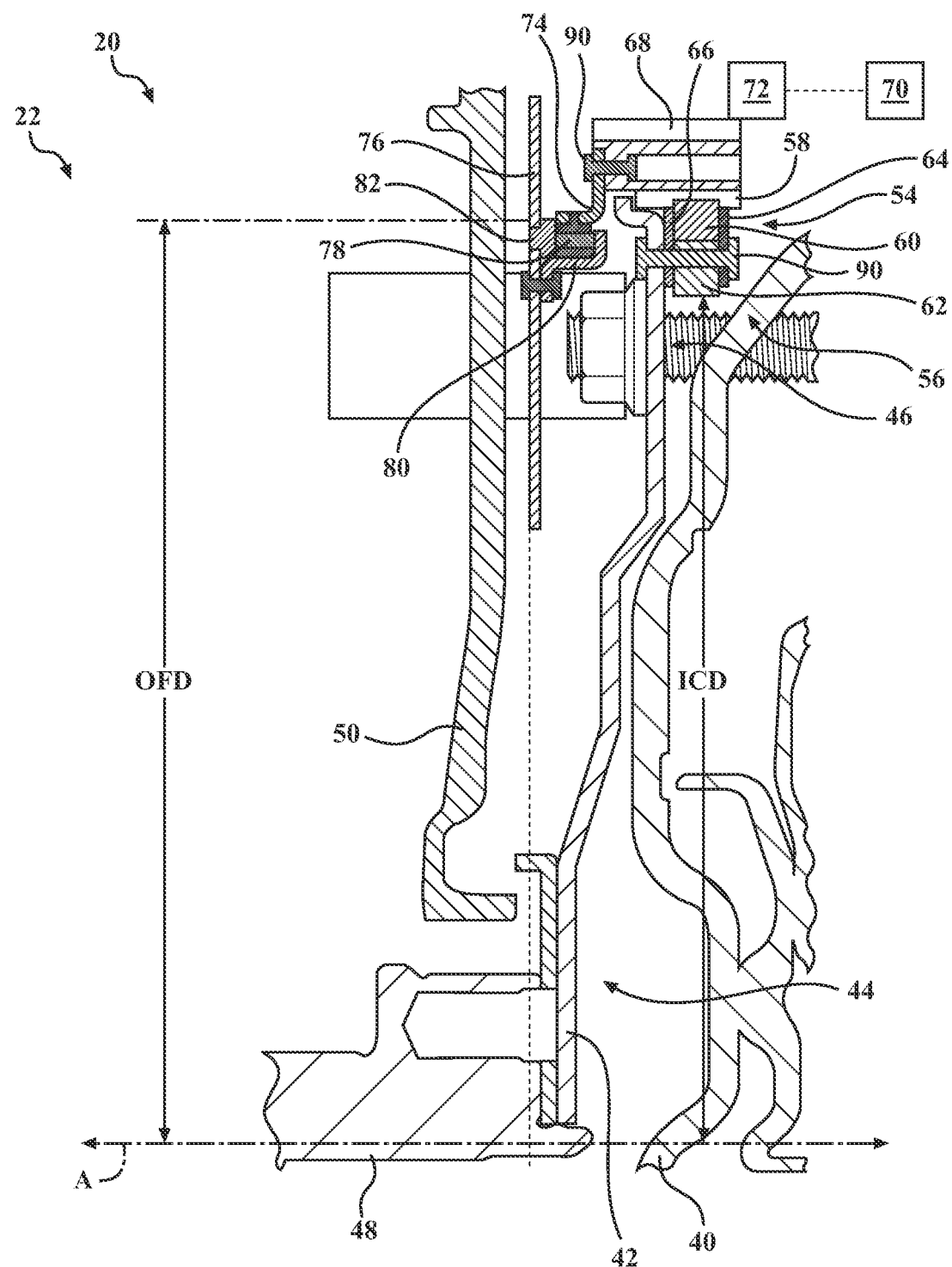
FIG. 7 is a cross-sectional view of another embodiment of the permanently engaged starter system, with the permanently engaged starter assembly including the one-way clutch, the ring gear rotatably coupled to the one-way clutch, and a flexplate of a torque converter.

With reference to the Figures, wherein like numerals indicate like parts throughout the several views, a permanently engaged starter assembly 20 for use in a permanently engaged starter system 22 for use in a vehicle (not numbered) is shown in FIGS. 1A-7. The permanently engaged starter system 22 includes a dual-mass flywheel 26 (FIGS. 1A-6) or a torque converter 40 (FIG. 7).

The dual-mass flywheel 26 extends along an axis A and has an inner diameter portion (i.e., not numbered, but less than 50% of the diameter of the dual-mass flywheel 26) disposed about and adjacent the axis A and an outer diameter portion 32 (i.e., portion of the dual-mass flywheel that is greater than 50% of the diameter of the dual-mass flywheel 26) disposed about the axis A such that the inner diameter portion is disposed between the outer diameter portion 32 and the axis A. It is to be appreciated that the axis A shown throughout the FIGS. may not be proportionally located at the rotation point (for example, FIG. 1A) of various components of the permanently engaged starter system 22. The dual-mass flywheel 26 may include an engine side primary mass 34 extending along and rotatable about the axis A with the engine side primary mass 34 being adapted to be rotatably coupled to the crankshaft 48, a transmission side primary mass 36 disposed about the axis A and rotatably coupled to the engine side primary mass 34, and a secondary mass (not shown) disposed about the axis A rotatably coupled to the transmission side primary mass 36 and adapted to be rotatably coupled to the transmission 52 (FIG. 1B). It is to be appreciated that the engine side primary mass 34 and the transmission side primary mass 36 may be integral, i.e., one piece, or may be two separate components.

When present and as shown in FIG. 7, the torque converter 40 includes a flexplate 42 having an inner flex diameter portion 44 disposed about and adjacent the axis A and an outer flex diameter portion 46 disposed about the axis A such that the inner flex diameter portion 44 is disposed between the outer flex diameter portion 46 and the axis A. The vehicle (not numbered) includes a crankshaft 48, an engine block 50, and a transmission 52 (FIG. 1B).

With reference to FIGS. 1A-7, the permanently engaged starter assembly 20 includes a one-way clutch 54 extending along the axis A, with the one-way clutch 54 including an inner member 56, such as an inner race, disposed about the axis A and an outer member 58, such as an outer race, disposed about the inner member 56. In one embodiment, the one-way clutch 54 includes ratchet locking elements 60 as the inner member 56 selectively rotatably coupling the ring gear 68 to the dual-mass flywheel 26 or to the flexplate 42 of the torque converter 40. The ratchet locking elements 60 may be further defined as rockers, pawls, or struts. When the ratchet locking elements 60 are further defined as pawls, the one-way clutch 54 may further include a pawl support element 62 as part of the inner member 56 coupled to the pawl and adapted to be coupled to the dual-mass flywheel 26 or to the flexplate of the torque converter 40.

Figure 8:
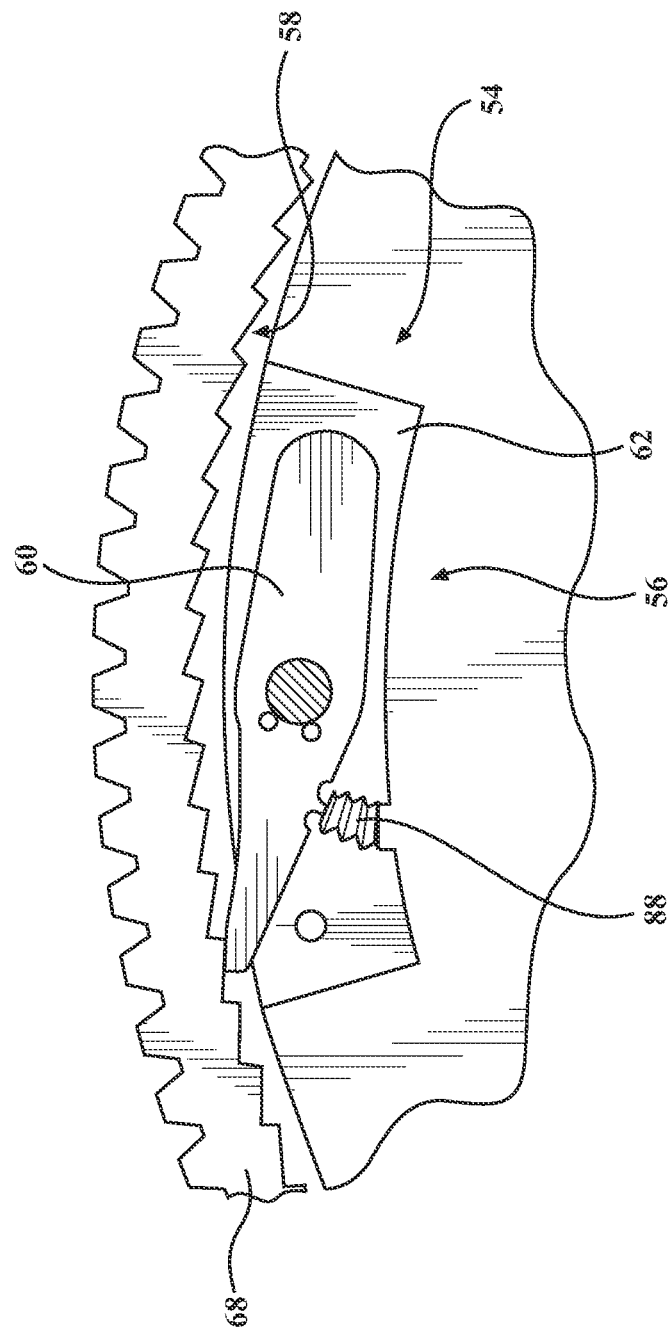
FIG. 8 is a cross-sectional view of the one-way clutch.

The one-way clutch 54 may include a biasing member 88 as shown in FIG. 8, such as a spring, for biasing the ratchet locking elements 60. In one embodiment, the outer member 58 of the one-way clutch is further defined as an inner diameter of the ring gear 68. For example, the inner diameter of the ring gear 68 may include teeth (notches) for engagement by the inner member 56. During rotation of the one-way clutch 54 about the axis A, the ratchet locking elements 60 of the one-way clutch 54 centrifugally disengage. When the ratchet locking elements 60 centrifugally disengage, the one-way clutch 54 is "overrun" such that the one-way clutch 54 no longer transmits torque to the crankshaft 48 of the engine. Furthermore, the ratchet locking elements 60, when centrifugally disengaged, result in no drag losses because there is no connection between the one-way clutch 54 and the crankshaft 48. The one-way clutch 54 may include a first side plate 64 and a second side plate 66 axially spaced from the first side plate 64. When present, the first and second side plates 64, 66 keep contaminants out of the one-way clutch 54. The first and second side plates 64, 66 may be comprised of any suitable material, such as stainless steel.

The first and second side plates 64, 66 may be adapted to be coupled to the outer diameter portion 32 of the dual-mass flywheel 26 by a rivet 90 or welding or to the outer flex diameter portion 46 of the flexplate 42 by a rivet 90 (at least one rivet) or welding. Specifically, the dual-mass flywheel 26 may include at least one radial tab 92 extending from the axis for coupling to the one-way clutch 54. Typically, the radial tab 92 extends from the transmission side primary mass 36 of the dual-mass flywheel 26. The radial tab 92 may extend from the engine side primary mass 34 of the dual-mass flywheel 26. The dual-mass flywheel 26 may include more than one radial tab 92. For example, the dual-mass flywheel 92 may have the same number of radial tabs 92 as there are one-way clutches 54. For example, if there is a single one-way clutch 54, then the dual-mass flywheel 92 may have a single radial tab 92. If there are two one-way clutches 54 (two one-way clutch portions 54), then the dual-mass flywheel 92 may have two radial tabs 92. If there are three one-way clutches 54 (three one-way clutch portions 54), then the dual-mass flywheel 92 may have three radial tabs 92. If there are four one-way clutches 54 (four one-way clutch portions 54), then the dual-mass flywheel 92 may have four radial tabs 92. If there are five one-way clutches 54 (five one-way clutch portions 54), then the dual-mass flywheel 92 may have five radial tabs 92. If there are six one-way clutches 54 (six one-way clutch portions 54), then the dual-mass flywheel 92 may have six radial tabs 92. If there are seven one-way clutches 54 (seven one-way clutch portions 54), then the dual-mass flywheel 92 may have seven radial tabs 92. If there are eight one-way clutches 54 (eight one-way clutch portions 54), then the dual-mass flywheel 92 may have eight radial tabs 92. If there are nine one-way clutches 54 (nine one-way clutch portions 54), then the dual-mass flywheel 92 may have nine radial tabs 92. If there are ten one-way clutches 54 (ten one-way clutch portions 54), then the dual-mass flywheel 92 may have ten radial tabs 92. When the first and second side plates 64, 66 are coupled to the outer diameter portion 32 of the dual-mass flywheel 26, the first and second side plates 64, 66 may be riveted or welded to the primary mass (for example the transmission side primary mass 36 or the engine side primary mass 34) or to the secondary mass of the dual-mass flywheel 26. When the first and second side plates 64, 66 are riveted, it allows for easy assembly and in particular disassembly of the one-way clutch 54 from the dual-mass flywheel 26 or the flexplate 42.

The permanently engaged starter assembly 20 also includes a ring gear 68 rotatably coupled to the one-way clutch 54. The permanently engaged starter assembly 20 may further include a starter motor 70 including a pinion gear 72 rotatably coupled to the ring gear 68 for providing rotational torque to the crankshaft 48 through the one-way clutch 54 and the dual-mass flywheel 26 or the flexplate 42 of the torque converter 40.

The ring gear 68 is adapted to be rotatably coupled to the outer diameter portion 32 of the dual-mass flywheel 26 or to the outer flex diameter portion 46 of the flexplate 42 through the one-way clutch 54. Specifically, in one embodiment, as shown in FIGS. 1A-6, the ring gear 68 is adapted to be rotatably coupled to the outer diameter portion 32 of the dual-mass flywheel 26 through the one-way clutch 54. In other embodiments, as shown in FIG. 7, the ring gear 68 is adapted to be rotatably coupled to the outer flex diameter portion 46 of the flexplate 42 through the one-way clutch 54. During a starting event, the ring gear 68 is rotatably about the axis to transfer torque through the one-way clutch 54, to the dual-mass flywheel 26 or the flexplate 42, and to the crankshaft 48 of the engine. After the starting event and after the one-way clutch 54 is overrun, the ring gear 68 stops rotating about the axis A until another starting event is needed.

Having the ring gear 68 is adapted to be rotatably coupled to the outer diameter portion 32 of the dual-mass flywheel 26 or to the outer flex diameter portion 46 of the flexplate 42 through the one-way clutch 54 offers several advantages. First, having the ring gear 68 rotatably coupled to the outer diameter portion 32 of the dual-mass flywheel or to the outer flex diameter portion 46 of the flexplate 42 allows the permanently engaged starter assembly 20 to be used with previous designs of the dual-mass flywheel 26 or flexplate 42. In other words, the dual-mass flywheel 26 or the flexplate 42 does not need to be retrofitted or redesigned to be usable with the permanently engaged starter assembly 20. Second, having the ring gear 68 rotatably coupled to the outer diameter portion 32 of the dual-mass flywheel or to the outer flex diameter portion 46 of the flexplate 42 reduces the packaging space of the permanently engaged starter system 22 within an engine bay of the vehicle (not numbered). Specifically, having the ring gear 68 rotatably coupled to the outer diameter portion 32 of the dual-mass flywheel or to the outer flex diameter portion 46 of the flexplate 42 reduces the axial packaging space of the permanently engaged starter system 22.

The permanently engaged starter assembly 20 may include a ring gear support element 74 disposed about the axis A and coupled to the ring gear 68 for axially retaining the ring gear 68 with respect to the axis A and for radially retaining the ring gear 68 such that the ring gear 68 is adapted to be rotatably coupled to the outer diameter portion 32 of the dual-mass flywheel 26 through the one-way clutch 54 or adapted to be rotatably coupled to the outer flex diameter portion 46 of the flexplate 42. Having the ring gear support element 74 coupled to the ring gear axially and radially retains the ring gear 68 with respect to the axis A. The ring gear support element 74 may be riveted or welded to the ring gear 68.

In one embodiment, the ring gear support element 74 is further defined as at least two separate ring gear support elements 74, with the ring gear support elements 74 being circumferentially spaced from one another about the axis A. The ring gear support element 74 may be further defined as any suitable number of ring gear support elements 74, such as three ring gear support elements 74, four ring gear support elements 74, five ring gear support elements 74, six ring gear support elements 74, seven ring gear support elements 74, eight ring gear support elements 74, nine ring gear support elements 74, or ten ring gear support elements 74. When the ring gear support element 74 is further defined as at least two ring gear support elements, the ring gear support elements 74 may be equally circumferentially spaced about the axis A from one another. For example, when the ring gear support element 74 is further defined as three ring gear support elements 74, each ring gear support element 74 may be circumferentially spaced 120 degrees from one another about the axis A. When the ring gear support element 74 is further defined as four ring gear support elements 74, each ring gear support element 74 may be circumferentially spaced 90 degrees from one another about the axis A. When the ring gear support element 74 is further defined as five ring gear support elements 74, each ring gear support element 74 may be circumferentially spaced 72 degrees from one another about the axis A. When the ring gear support element 74 is further defined as six ring gear support elements 74, each ring gear support element 74 may be circumferentially spaced 60 degrees from one another about the axis A. Having the ring gear support element 74 further defined as at least two ring gear support elements 74 decreases the amount of space occupied by the permanently engaged starter assembly 20, reduces the overall material needed for the ring gear support element 74, reduces overall weight of the permanently engaged starter assembly 20, and allows easy assembly and disassembly of the permanently engaged starter assembly 20.

The one-way clutch 54 may be further defined as at least two separate one-way clutch portions 54 circumferentially spaced from one another about the axis A. The advantage of having the one-way clutch 54 further defined as at least two one-way clutch portions 54 is that that rather than having the one-way clutch 54 disposed 360 degrees about the axis A as a single component, the one-way clutch 54 being defined as at least two one-way clutch portions 54 decreases the amount of space occupied by the permanently engaged starter assembly 20, reduces overall material of the one-way clutch 54, reduces weight of the one-way clutch 54, and allows easy assembly and disassembly of the permanently engaged starter assembly 20. The one-way clutch 54 may be further defined as any suitable number of one-way clutch portions 54, such as three one-way clutch portions 54, four one-way clutch portions 54, five one-way clutch portions 54, six one-way clutch portions 54, seven one-way clutch portions 54, eight one-way clutch portions 54, nine one-way clutch portions 54, or ten one-way clutch portions 54. When the one-way clutch 54 is defined as at least two separate one-way clutch portions 54, the at least two one-way clutch portions 54 may be equally circumferentially spaced about the axis A with respect to one another. For example, when the one-way clutch 54 is further defined as three one-way clutch portions 54, each one-way clutch portion 54 may be circumferentially spaced 120 degrees from one another about the axis A. When the one-way clutch 54 is further defined as four one-way clutch portions 54, each one-way clutch portion 54 may be circumferentially spaced 90 degrees from one another about the axis A. When the one-way clutch 54 is further defined as five one-way clutch portions 54, each one-way clutch portion 54 may be circumferentially spaced 72 degrees from one another about the axis A. When the one-way clutch 54 is further defined as six one-way clutch portions 54, each one-way clutch portion 54 may be circumferentially spaced 60 degrees from one another about the axis A.

The permanently engaged starter assembly 20 may include a starter support plate 76 (also referred to as a spacer plate) adapted to be rigidly coupled to the engine block 50 (FIG. 1B; RFOB: rear face of engine block) such that the starter support plate 76 is stationary with respect to the axis A. The ring gear 68, through the ring gear support element 74, is coupled to the starter support plate 76 such that the ring gear 68 is axially retained with respect to the axis A.

The permanently engaged starter assembly 20 may include a bushing 78 coupled to the ring gear support element 74 for supporting the ring gear support element 74 during rotation about the axis A. The bushing 78 is rigidly coupled to the starter support plate 76 such that the bushing 78 and the starter support plate 76 are stationary with respect to the axis A during operation of the permanently engaged starter system 22. The permanently engaged starter assembly 20 may further include a bushing support element 80 coupled to the starter support plate 76 and to the bushing 78 for supporting the bushing 78. The bushing support element 80 may be riveted or welded to the starter support plate 76. The permanently engaged starter assembly 20 may additionally include a washer 82 disposed between the ring gear support element 74 and the starter support plate 76. The washer 82 may be any suitable material, such as nylon. The washer 82 is rigidly coupled to the starter support plate 76 such that the washer 82 and the starter support plate 76 are stationary with respect to the axis A during operation of the permanently engaged starter system 22.

Figure 1A:
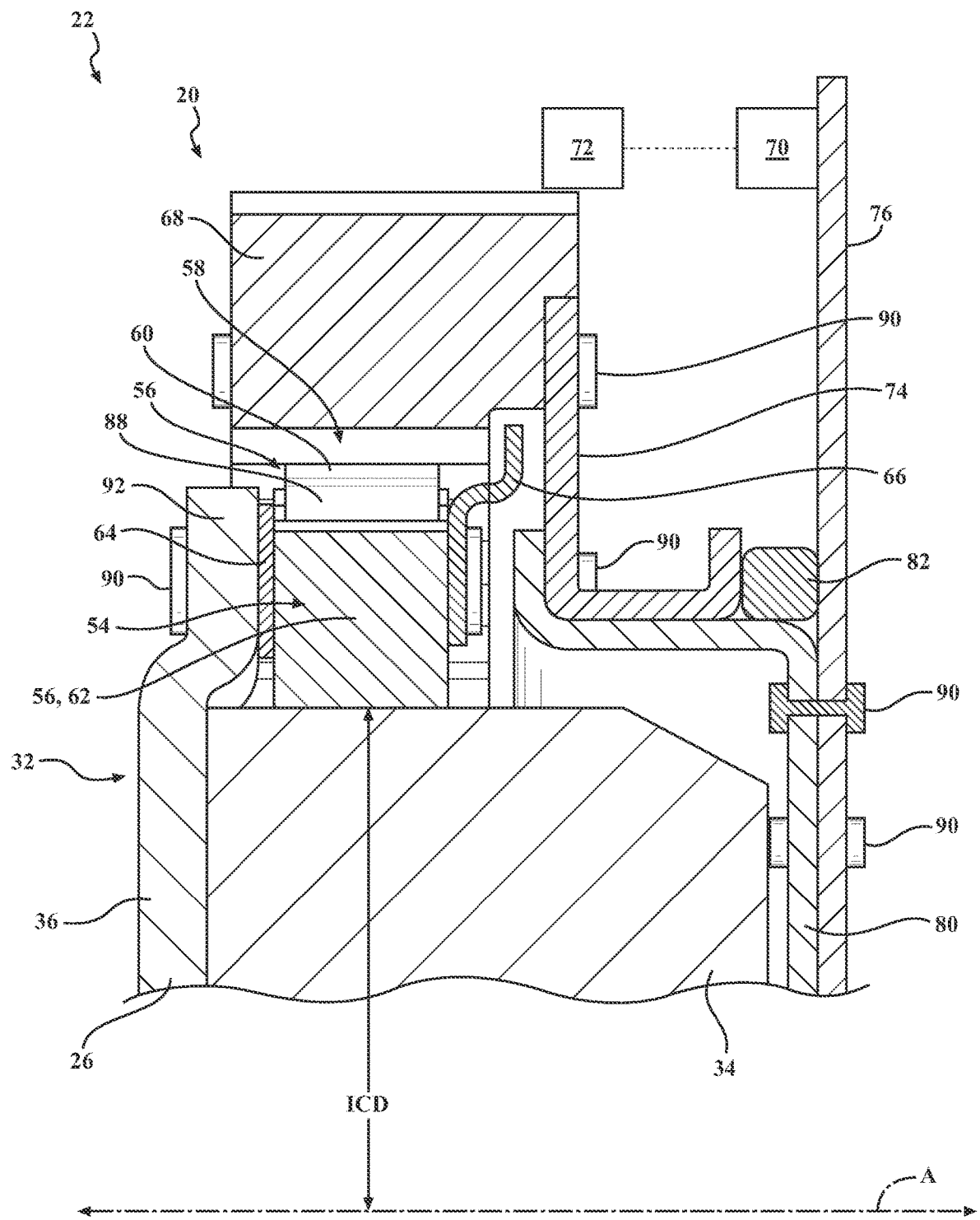
FIG. 1A is a cross-sectional view of a permanently engaged starter assembly of a permanently engaged starter system, with the permanently engaged starter assembly including a one-way clutch extending along an axis and including an inner member disposed about the axis and an outer member disposed about the inner member, and a ring gear rotatably coupled to the one-way clutch, and with the permanently engaged starter system including a dual-mass flywheel.
Figure 1B:
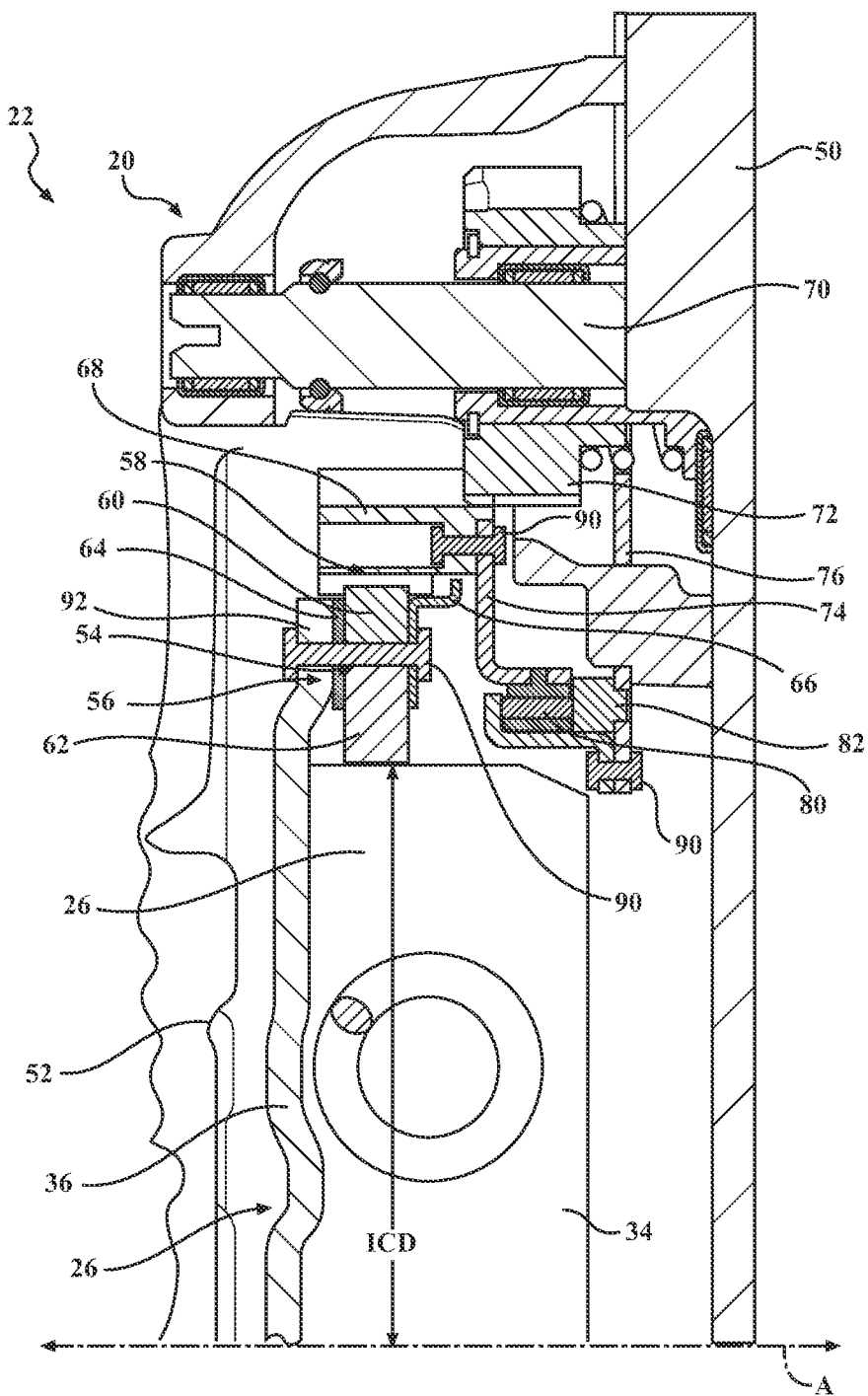
FIG. 1B is a cross-sectional view of the permanently engaged starter system of FIG. 1A.
Figure 2:
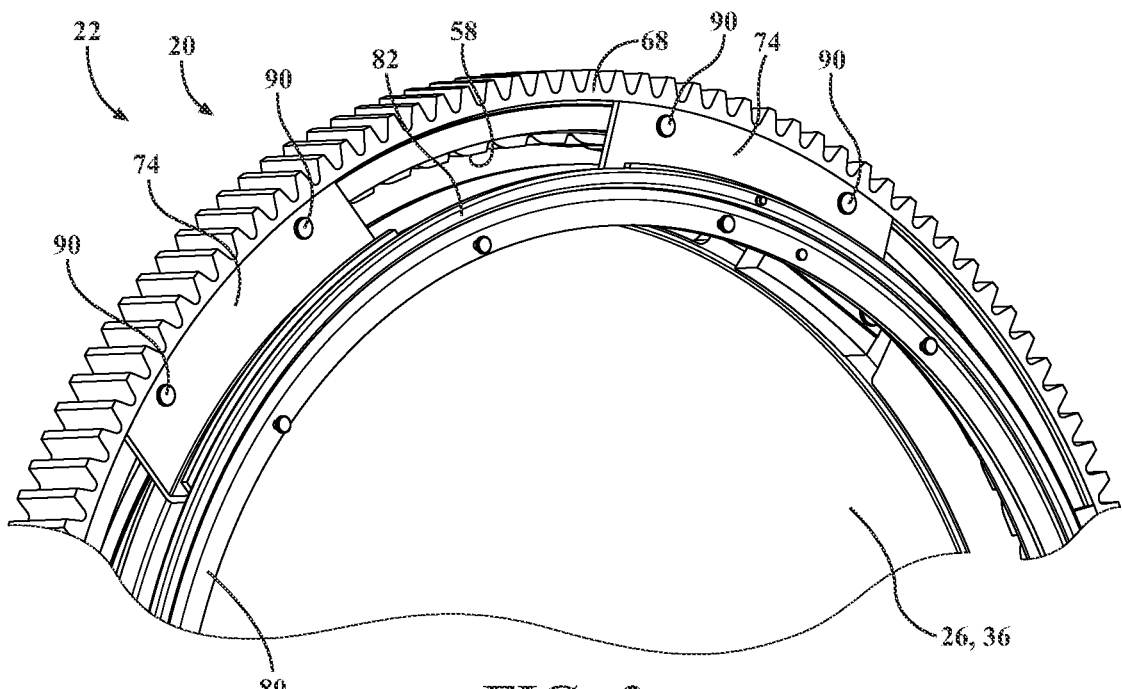
FIG. 2 is a perspective view of the permanently engaged starter assembly including a ring gear support element disposed about the axis and coupled to the ring gear for axially retaining the ring gear with respect to the axis and for radially retaining the ring gear.
Figure 3:
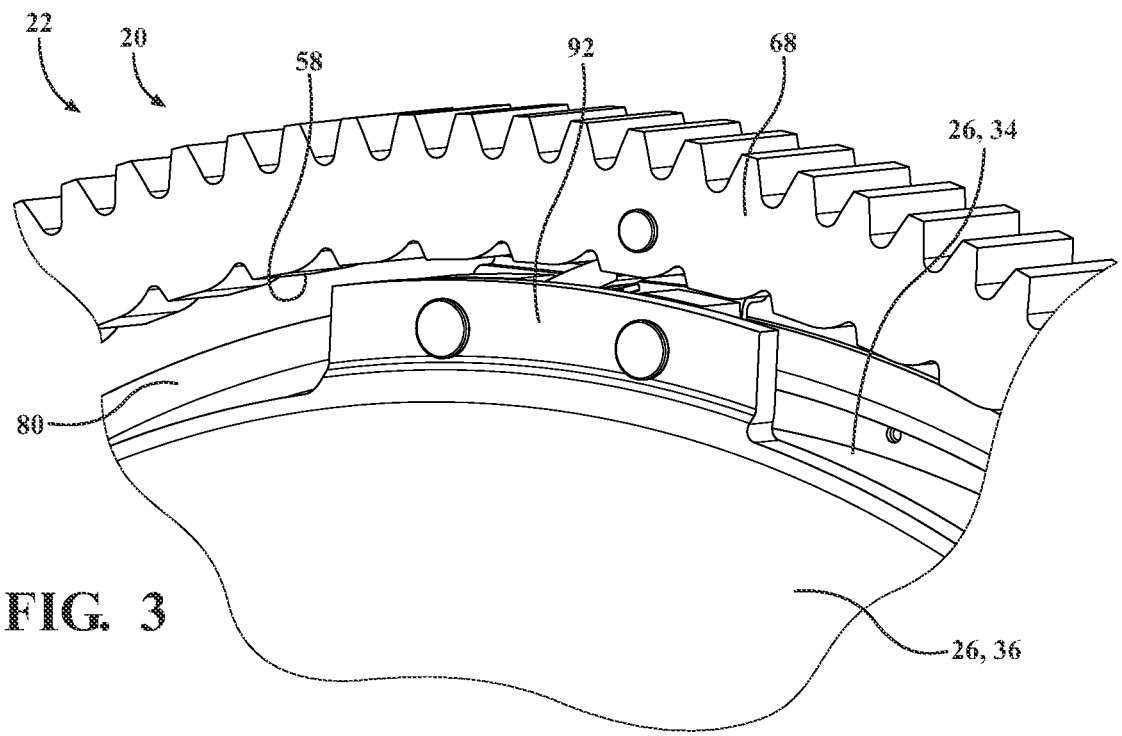
FIG. 3 is another perspective view of the permanently engaged starter assembly.
Figure 4:
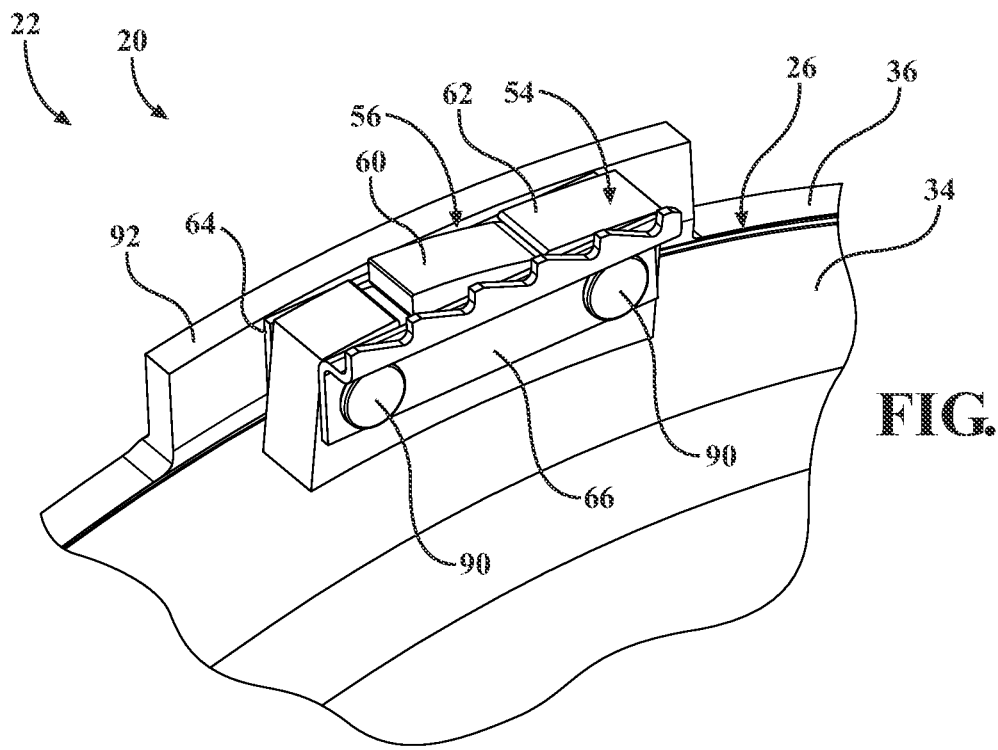
FIG. 4 is a perspective view of one embodiment of the one-way clutch of the permanently engaged starter assembly, and with the one-way clutch including a first and second side plate.
Figure 5:
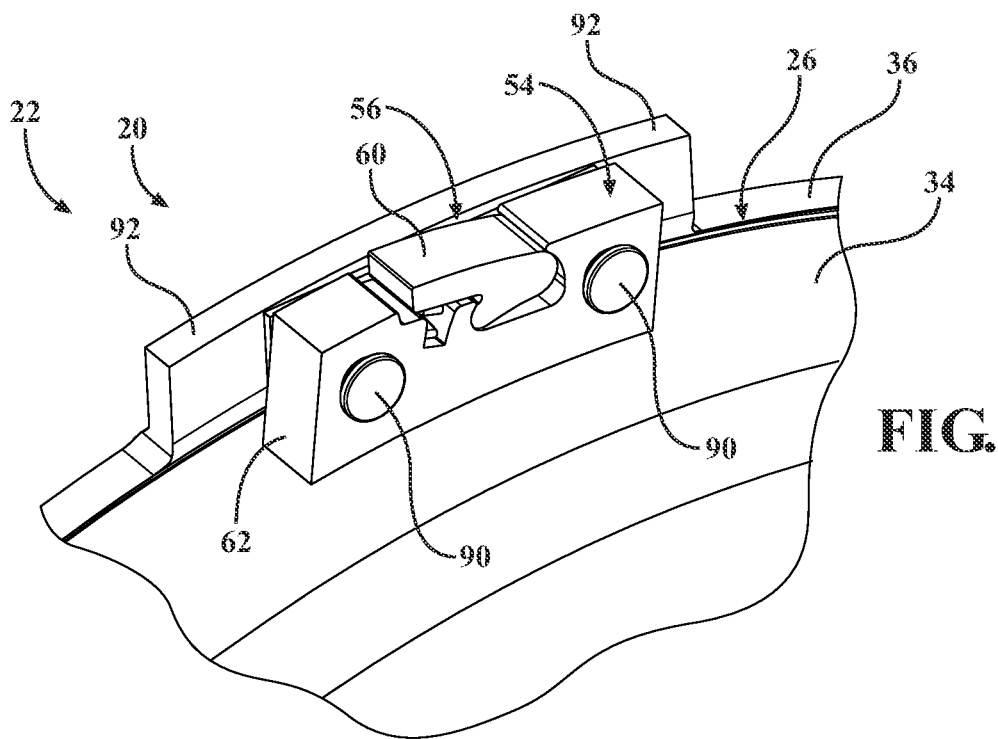
FIG. 5 is a perspective view of the one-way clutch of the permanently engaged starter assembly, with the second side plate removed.
Figure 6:
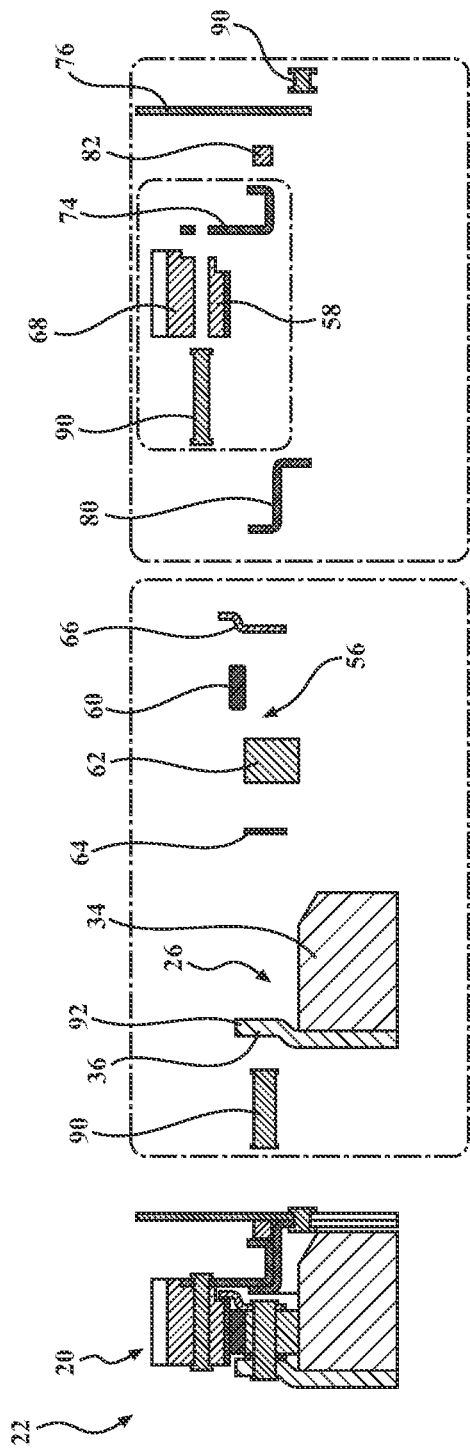
FIG. 6 is an exploded view of the permanently engaged starter system.

In one embodiment, the one-way clutch 54 has an inner clutch diameter ICD, and components (i.e., ring gear 68, starter motor 70, pinion gear 72, etc.) of the permanently engaged starter assembly 20 are radially disposed outside of the inner clutch diameter ICD with respect to the axis A, as shown in FIGS. 1A, 1B and 7.

The dual-mass flywheel 26 may have an outer flywheel diameter OFD, and components of the permanently engaged starter assembly 20 are disposed at the outside of the outer flywheel diameter OFD. Specifically, as shown in FIG. 1A and 1B, the one-way clutch 54 and the ring gear 68 are disposed outside of the outer flywheel diameter OFD with respect to the axis A. Additionally, when present, the ring gear support element 74 may also be disposed outside of the outer flywheel diameter OFD with respect to the axis A.

As shown in FIGS. 1A-6 and as described above, the ring gear 68 may be rotatably coupled to the outer diameter portion 32 of the dual-mass flywheel through the one-way clutch 54. The outer diameter portion 32 of the dual-mass flywheel 26 may be defined as a portion of the dual-mass flywheel 26 that is more than half of the diameter of the dual-mass flywheel 26 with respect to the axis A. In other embodiments, the outer diameter portion 32 of the dual-mass flywheel 26 may be defined as a portion of the dual-mass flywheel 26 that is more than 60% of the diameter of the dual-mass flywheel 26 with respect to the axis A. In other embodiments, the outer diameter portion 32 of the dual-mass flywheel 26 may be defined as a portion of the dual-mass flywheel 26 that is more than 70% of the diameter of the dual-mass flywheel 26 with respect to the axis A. In other embodiments, the outer diameter portion 32 of the dual-mass flywheel 26 may be defined as a portion of the dual-mass flywheel 26 that is more than 80% of the diameter of the dual-mass flywheel 26 with respect to the axis A. In other embodiments, the outer diameter portion 32 of the dual-mass flywheel 26 may be defined as a portion of the dual-mass flywheel 26 that is more than 90% of the diameter of the dual-mass flywheel 26 with respect to the axis A. In other embodiments, the outer diameter portion 32 of the dual-mass flywheel 26 may be defined as a portion of the dual-mass flywheel 26 that is more than 95% of the diameter of the dual-mass flywheel 26 with respect to the axis A.

In embodiments where the ring gear 68 is adapted to be rotatably coupled to outer flex diameter portion 46 of the flexplate 42, the ring gear may be rotatably coupled to the outer flex diameter portion 46 of the flexplate 42 through the one-way clutch 54, as shown in FIG. 7. The outer flex diameter portion 46 of the flexplate 42 may be defined as a portion of the flexplate 42 that is more than half of the diameter of the flexplate 42 with respect to the axis A. In other embodiments, the outer flex diameter portion 46 of the flexplate 42 may be defined as a portion of the flexplate 42 that is more than 60% of the diameter of the flexplate 42 with respect to the axis A. In other embodiments, the outer flex diameter portion 46 of the flexplate 42 may be defined as a portion of the flexplate 42 that is more than 70% of the diameter of the flexplate 42 with respect to the axis A. In other embodiments, the outer flex diameter portion 46 of the flexplate 42 may be defined as a portion of the flexplate 42 that is more than 80% of the diameter of the flexplate 42 with respect to the axis A. In other embodiments, the outer flex diameter portion 46 of the flexplate 42 may be defined as a portion of the flexplate 42 that is more than 90% of the diameter of the flexplate 42 with respect to the axis A. In other embodiments, the outer flex diameter portion 46 of the flexplate 42 may be defined as a portion of the flexplate 42 that is more than 95% of the diameter of the flexplate 42 with respect to the axis A.

What is claimed is:

1. A permanently engaged starter system for use in a vehicle including a crankshaft and an engine block, said permanently engaged starter system comprising:
    a dual-mass flywheel extending along an axis and having an inner diameter portion disposed about and adjacent said axis and an outer diameter portion disposed about said axis such that said inner diameter portion is disposed between said outer diameter portion and said axis; and
    a permanently engaged starter assembly comprising,
        a one-way clutch extending along said axis and comprising an inner member disposed about said axis and an outer member disposed about said inner member, and
        a ring gear rotatably coupled to said one-way clutch;
        wherein said ring gear is adapted to be rotatably coupled to said outer diameter portion of said dual-mass flywheel through said one-way clutch.

2. The permanently engaged starter system as set forth in claim 1, wherein said permanently engaged starter assembly further includes a starter motor comprising a pinion gear rotatably coupled to said ring gear for providing rotational torque to the crankshaft through said one-way clutch and said dual-mass flywheel.

3. The permanently engaged starter system as set forth in claim 1, wherein said permanently engaged starter assembly further comprises a ring gear support element disposed about said axis and coupled to said ring gear for axially retaining said ring gear with respect to said axis and for radially retaining said ring gear with respect to said axis, and wherein said ring gear is rotatably coupled to said outer diameter portion of said dual-mass flywheel through said one-way clutch.

4. The permanently engaged starter system as set forth in claim 3, wherein said ring gear support element is further defined as at least two separate ring gear support elements, wherein said at least two separate ring gear support elements are circumferentially spaced from one another about said axis.

5. The permanently engaged starter system as set forth in claim 3, wherein said permanently engaged starter assembly further comprises a starter support plate adapted to be rigidly coupled to the engine block such that said starter support plate is stationary with respect to said axis, wherein said ring gear, through said ring gear support element, is coupled to said starter support plate such that said ring gear is axially retained with respect to said axis.

6. The permanently engaged starter system as set forth in claim 5, wherein said permanently engaged starter assembly further comprises a bushing coupled to said ring gear support element for supporting said ring gear support element during rotation about said axis, and further comprising a bushing support element coupled to said starter support plate and to said bushing for supporting said bushing.

7. The permanently engaged starter system as set forth in claim 6, wherein said bushing support element is riveted or welded to said starter support plate.

8. The permanently engaged starter system as set forth in claim 6, wherein said permanently engaged starter assembly further comprises a washer disposed between said ring gear support element and said starter support plate.

9. The permanently engaged starter system as set forth in claim 3, wherein said ring gear support element is riveted or welded to said ring gear.

10. The permanently engaged starter system as set forth in claim 1, wherein said one-way clutch includes ratchet locking elements for selectively rotatably coupling said ring gear to said dual-mass flywheel.

11. The permanently engaged starter system as set forth in claim 10, wherein said ratchet locking elements are further defined as pawls, wherein said one-way clutch further includes a pawl support element coupled to said pawl and coupled to said dual-mass flywheel.

12. The permanently engaged starter system as set forth in claim 1, wherein said one-way clutch is further defined as at least two separate one-way clutch portions circumferentially spaced from one another about said axis.

13. The permanently engaged starter system as set forth in claim 1, wherein said one-way clutch includes a first side plate and a second side plate axially spaced from said first side plate, and wherein said first and second side plates are coupled to said outer diameter portion of said dual-mass flywheel by a rivet or welding.

14. The permanently engaged starter system as set forth in claim 1, wherein said one-way clutch has an inner clutch diameter, and wherein said one-way clutch and said ring gear of said permanently engaged starter assembly are radially disposed outside of said inner diameter with respect to said axis.

15. The permanently engaged starter system as set forth in claim 1, wherein said outer member of said one-way clutch is further defined as an inner diameter of said ring gear.

16. The permanently engaged starter system as set forth in claim 15, wherein said inner member of said one-way clutch comprises ratchet locking elements for selectively rotatably coupling said ring gear to said dual-mass flywheel.

17. The permanently engaged starter system as set forth in claim 1, wherein said dual-mass flywheel has an outer flywheel diameter, and wherein said one-way clutch and said ring gear of said permanently engaged starter assembly are radially disposed outside of said outer flywheel diameter with respect to said axis.

18. A permanently engaged starter assembly for use in a permanently engaged starter system for use in a vehicle, with the vehicle including a crankshaft and an engine block, and with the permanently engaged starter system including, a dual-mass flywheel extending along an axis and having an inner diameter portion disposed about and adjacent the axis and an outer diameter portion disposed about the axis such that the inner diameter portion is disposed between the outer diameter portion and the axis, or a torque converter including a flexplate having an inner flex diameter portion disposed about and adjacent the axis and an outer flex diameter portion disposed about the axis such that the inner flex diameter portion is disposed between the outer flex diameter portion and the axis, said permanently engaged starter assembly comprising:

a one-way clutch comprising an inner member adapted to be disposed about the axis and an outer member disposed about said inner member; and a ring gear rotatably coupled to said one-way clutch;

wherein said ring gear is adapted to be rotatably coupled to the outer diameter portion of the dual-mass flywheel through said one-way clutch or adapted to be rotatably coupled to the outer flex diameter portion of the flexplate through said one-way clutch.

19. The permanently engaged starter assembly as set forth in claim 18, further comprising a starter motor comprising a pinion gear rotatably coupled to said ring gear for providing rotational torque to the crankshaft through said one-way clutch and the dual-mass flywheel or the flexplate of the torque converter.

20. A permanently engaged starter system for use in a vehicle including a crankshaft and an engine block, said permanently engaged starter system comprising:

a torque converter including a flexplate extending along an axis, with said flex plate having an inner flex diameter portion disposed about and adjacent said axis and an outer flex diameter portion disposed about said axis such that said inner flex diameter portion is disposed between said outer flex diameter portion and said axis; and a permanently engaged starter assembly comprising, a one-way clutch extending along said axis and comprising an inner member disposed about said axis and an outer member disposed about said inner member, and a ring gear rotatably coupled to said one-way clutch;

wherein said ring gear is adapted to be rotatably coupled to said outer flex diameter portion of said flexplate through said one-way clutch.

21. The permanently engaged starter system as set forth in claim 20, wherein said permanently engaged starter assembly further includes a starter motor comprising a pinion gear rotatably coupled to said ring gear for providing rotational torque to the crankshaft through said one-way clutch and said dual-mass flywheel.

22. The permanently engaged starter system as set forth in claim 20, wherein said permanently engaged starter assembly further comprises a ring gear support element disposed about said axis and coupled to said ring gear for axially retaining said ring gear with respect to said axis and for radially retaining said ring gear with respect to said axis, and wherein said ring gear is rotatably coupled to said outer diameter portion of said dual-mass flywheel through said one-way clutch.

23. The permanently engaged starter system as set forth in claim 22, wherein said permanently engaged starter assembly further comprises a starter support plate adapted to be rigidly coupled to the engine block such that said starter support plate is stationary with respect to said axis, wherein said ring gear, through said ring gear support element, is coupled to said starter support plate such that said ring gear is axially retained with respect to said axis.

24. The permanently engaged starter system as set forth in claim 23, wherein said permanently engaged starter assembly further comprises a bushing coupled to said ring gear support element for supporting said ring gear support element during rotation about said axis, and further comprising a bushing support element coupled to said starter support plate and to said bushing for supporting said bushing.

\* \* \* \* \*